(12) United States Patent
Xiang

(10) Patent No.: US 12,741,512 B2
(45) Date of Patent: Sep. 22, 2026

(54) HVAC DEHUMIDIFICATION SYSTEM

(71) Applicant: MAHLE INTERNATIONAL GMBH, Stuttgart (DE)

(72) Inventor: Ruifei Xiang, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 155 days.

(21) Appl. No.: 18/763,126

(22) Filed: Jul. 3, 2024

(65) Prior Publication Data

US 2026/0008324 A1 Jan. 8, 2026

(51) Int. Cl.
*B60H 3/02* (2006.01)
*F24F 3/14* (2006.01)

(52) U.S. Cl.
CPC ............... *B60H 3/024* (2013.01); *F24F 3/14* (2013.01); *F24F 2003/144* (2013.01)

(58) Field of Classification Search
CPC ........ B60H 3/024; F24F 3/14; F24F 2003/144
See application file for complete search history.

(56) References Cited

U.S. PATENT DOCUMENTS 10,882,379 B2 * 1/2021 Srivastava ......... B60H 1/00878
2014/0223943 A1 * 8/2014 Ichishi ................. B60H 1/3205 62/215
2020/0406710 A1 * 12/2020 Ariaux ............... B60H 1/00328
2025/0353357 A1 * 11/2025 Saito .................. B01D 46/2418

FOREIGN PATENT DOCUMENTS

KR 20170057018 A * 5/2017 ................ F24F 3/14

* cited by examiner

*Primary Examiner* — Ana M Vazquez
(74) *Attorney, Agent, or Firm* — Barnes & Thornburg

(57) ABSTRACT

An air intake system for a vehicle HVAC system is provided. The system includes a housing with an air inlet, a dehumidification component, a first outlet and a second outlet disposed to receive air that has flowed past the dehumidification component, wherein the first outlet is aligned to direct air flowing therethrough toward a downstream fan that provides air flow within a vehicle HVAC system and ultimately to a passenger compartment for the vehicle, and the second outlet is aligned to direct air flowing therethrough out of the vehicle and not into the passenger compartment. The dehumidification component is configured to receive electric current during operation.

15 Claims, 7 Drawing Sheets

HVAC DEHUMIDIFICATION SYSTEM

BACKGROUND OF THE INVENTION

This application relates to an HVAC system for a vehicle and particularly to an HVAC system for a vehicle that is capable of operating under electrical power.

SUMMARY OF THE INVENTION

A first representative embodiment of the disclosure is provided. The embodiment includes an air intake system for a vehicle HVAC system. The system includes a housing comprising an air inlet, a dehumidification component, a first outlet and a second outlet disposed to receive air that has flowed past the dehumidification component, wherein the first outlet is aligned to direct air flowing therethrough toward a downstream fan that provides air flow within a vehicle HVAC system and ultimately to a passenger compartment for the vehicle, and the second outlet is aligned to direct air flowing therethrough out of the vehicle and not into the passenger compartment. The dehumidification component is configured to receive electric current during operation.

Other representative embodiments of the disclosure are provided and include the structure describe in one or more of Representative Paragraphs 1-14 provided at the end of this specification of this application.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
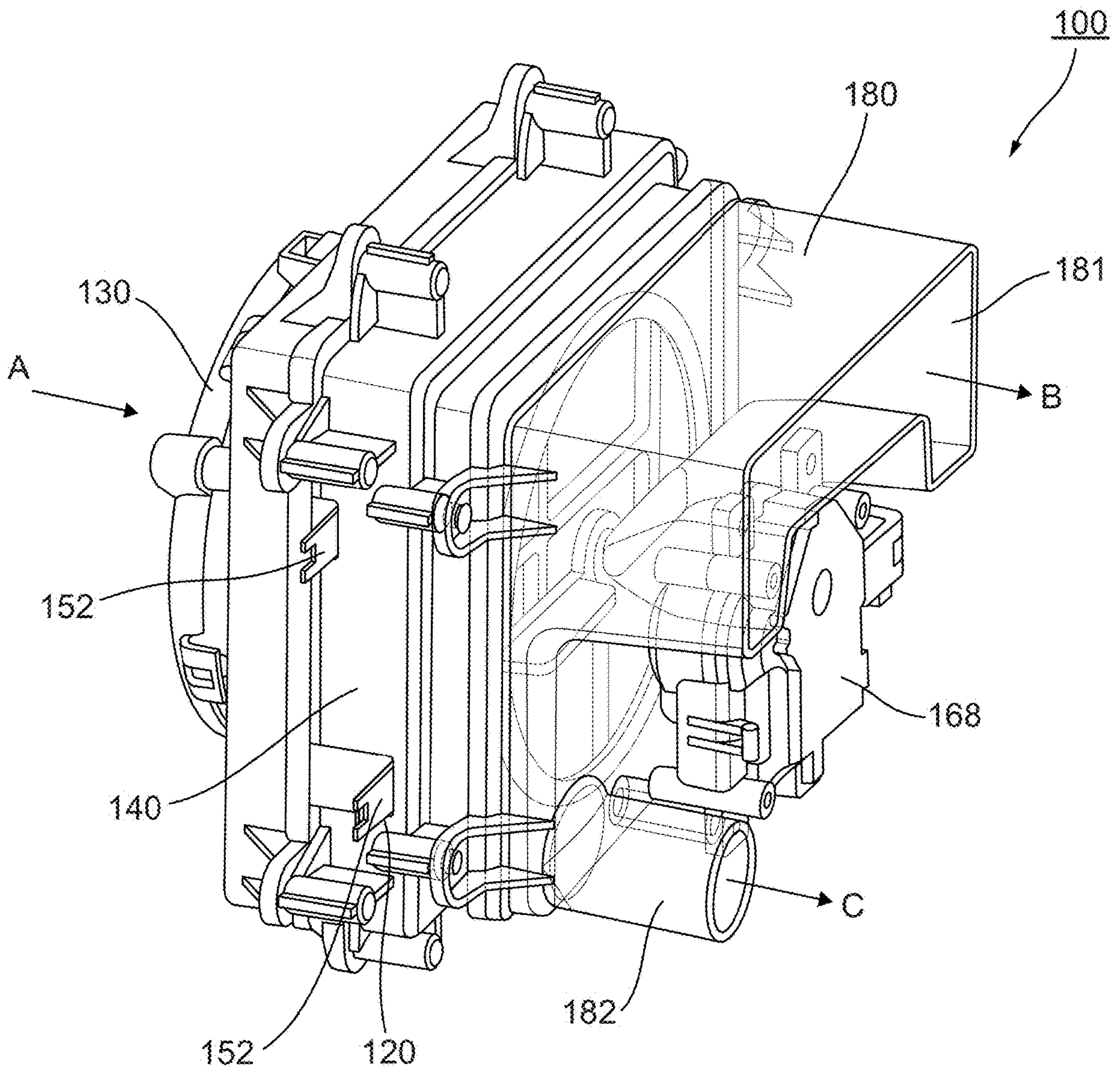
FIG. 1 is a perspective view of a first air intake system that is usable with an HVAC system, to provide air to an intake of a fan housing within the HVAC system.

Turning now to FIGS. 1-7 an air intake system 100 for a vehicle HVAC system 10 is provided. The air intake system 100 is configured to receive air from an inlet 130 and is configured to assist with the removal of water vapor from the air that enters the system 100 such that air that flows out of a first outlet 181 thereof, which flows directly or indirectly into an air inlet within a fan housing 300 of an HVAC system 10 for a vehicle. The air intake system 100 may be positioned within a vehicle such that air that flows out of the first outlet 181 (discussed in further detail below) flows directly into a first air intake of the HVAC fan housing 300. In other embodiments, the air intake system 100 may be positioned within the vehicle such that air that flows out of the first outlet 181 flows indirectly into the first air intake of the HVAC fan housing 300, such as with a conduit between the two. The fan housing 300 provides air to an air conditioning housing 400, which modifies the air temperature as desired and has a plurality of outlet paths to different portions of a passenger compartment.

The air intake system 100 is configured to be used with a vehicle, such as a passenger vehicle, to provide for moisture removal from air that flows toward and into a vehicle HVAC system. In some embodiments, the air intake system 100 is particularly suited for electrical vehicles that are powered (both for movement of the vehicle and for the other loads of the vehicle (i.e. climate control, infotainment, window operation, and the like) from current drawn from a rechargeable battery, or for hybrid vehicles where the vehicle's propulsion can be selectively powered from an internal combustion engine or with electrical power from an on board battery. In other embodiments, the air intake system 100 may be implemented in other vehicles or machines that include passenger compartments, or that use air flow therein for various purposes, particularly for vehicles or machines that can operate with electric power but do not have a constant access to electrical power. For example, the air intake system 100 may be used with the HVAC systems of farm equipment, large trucks (e.g. dump trucks, cement trucks), cranes, material handling equipment, boats, trains, aircraft, or the like. For the sake of brevity this specification is specifically directed to passenger vehicles but the air intake system 100 could be readily adapted for HVAC systems of other vehicles or machines as will be readily understood to those of skill in the art with a thorough review and understanding of this specification and figures.

The air intake system 100 is beneficial for hybrid vehicles operating in battery mode or for fully electric vehicles, because it allows for HVAC operation entirely from, or with a significant percentage of, air that flows into the HVAC system from the passenger compartment. In this circumstance, particularly during operation when the outside temperature is significantly lower than the desired temperature within the passenger compartment, allowing the HVAC system to receive air from the passenger compartment (rather than the HVAC system receiving air from outside of the vehicle) minimizes the electrical power needed to heat the air that flows through the HVAC system before leaving the HVAC system—either flowing into the passenger compartment or being used for a defrost or demist system. As is well experienced in the art, during vehicle operation when the passenger compartment temperature is significantly higher than the outside temperature, it is often problematic for an HVAC system to receive air from the passenger compartment, because the air within the passenger compartment—particularly after the vehicle has been operated for a while, has a much higher humidity than the outside air due to the humidity added to the air by the passenger occupants. Operation of the HVAC system with intake air with a high relative humidity causes windows to fog due to the outside temperature (transferred through the windows) reaching or extending below the dew point of the air. The air intake system 100 disclosed herein is beneficial for operation of vehicle (particularly in the cold weather months) because the air intake system 100 removes water vapor from the intake air (when received from the passenger compartment), which increases the dew point of the air that returns to the passenger compartment from the HVAC system—thereby reducing or eliminating the tendency of window fogging and also eliminating the need for the HVAC system to operate to inject significant heat to the air flowing through the HVAC system before flowing the passenger compartment—which, as discussed above, requires significant electrical power to operate the heat pump system and in some situations electric heaters downstream of the heat pump heater.

In some embodiments, a valve 80 may be provided upstream of the air intake system 100 (FIG. 7, schematic), with two flow paths that direct air to the valve 80, with a conduit (87) downstream of the valve 80 leading to the air inlet 130. In this embodiment, the first flow path may be air that is drawn from the passenger compartment (88) of the vehicle, and the second flow path is air that is drawn from outside of the vehicle (89).

An HVAC controller 1000 causes the valve 80 to be positioned to allow the desired air flow to enter the air intake system 100. For example, in winter months, the valve 80 may be open to allow flow from the passenger compartment into the air intake system 100 and ultimately to the air inlet of the fan housing 300, to inject warm air (in comparison to the temperature of the air outside of vehicle) to minimize the need to heat the air that flows through the HVAC system as is required when air from outside of the vehicle is received within the system 100. Relatively cold air, such as air from outside of the vehicle during winter months, is often much colder than the current or desired temperature passenger compartment, which requires significant electrical power (through operation of the compressor of the heat pump system within the HVAC system and through, when necessary operation of resistance heaters within the HVAC system) to warm the air that flows out of the HVAC system and into the passenger compartment (or for use, for example in the defrost or demist systems).

In other situations, the HVAC controller 1000 may cause the valve 80 to be positioned (either directly or indirectly) to direct air from outside of the vehicle to flow to the air intake system 100 when the outside air temperature is the same as or close to the desired air temperature within the passenger compartment.

Turning now to FIG. 1, a first embodiment of the air intake system 100 is provided. The system 100 includes a housing 120 that supports all of the components of the system, including an air inlet 130, a dehumidification component 150, a valve 160, a heat sink 170, a first air outlet 181, and a second air outlet 182. The components are preferably arranged such that the dehumidification component 150 is arranged upstream of the valve 160 (from the perspective of the air that flows through the housing 120, but in other embodiments, the valve 160 may be positioned upstream of the dehumidification component 150.

Figure 2:
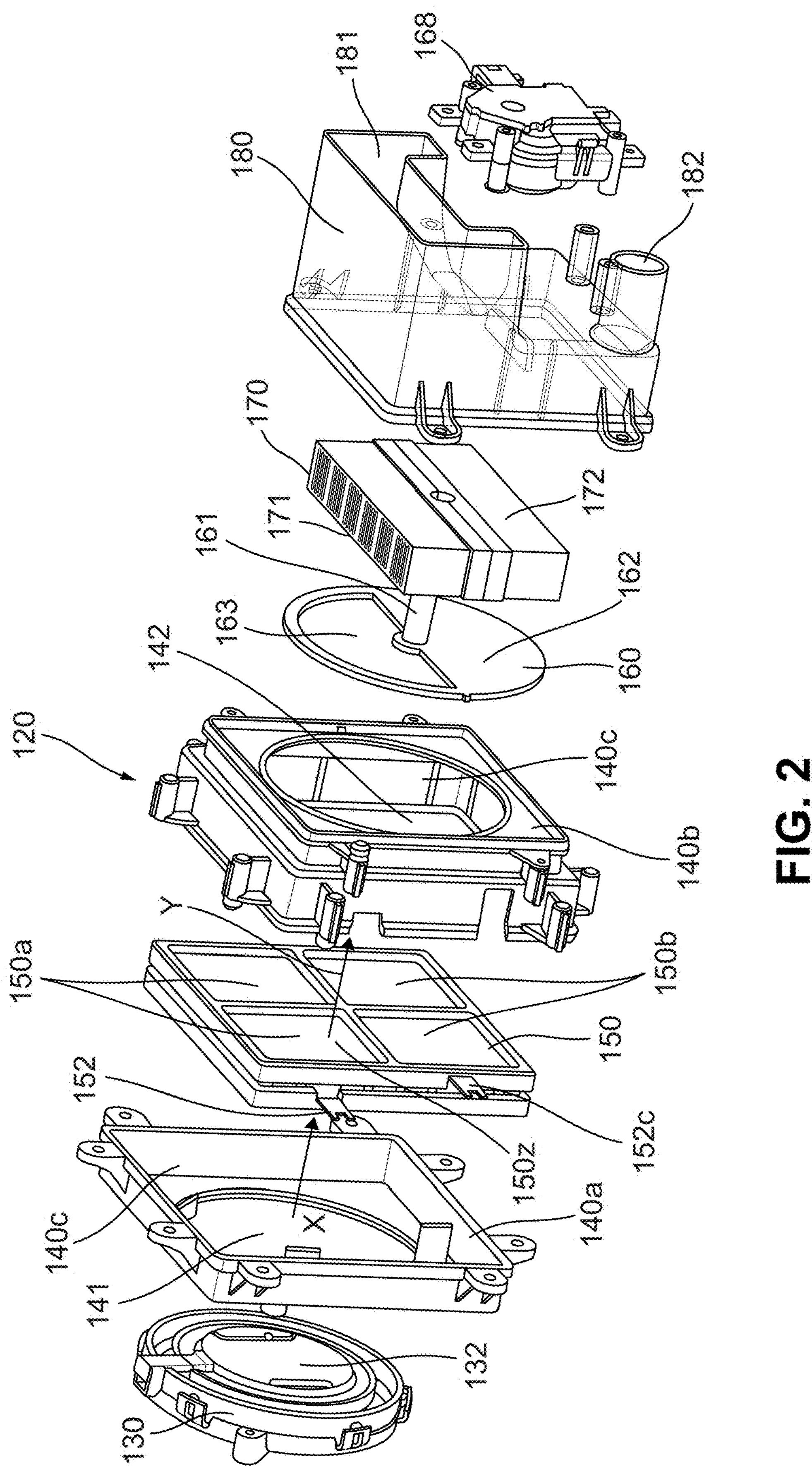
FIG. 2 is an exploded view of the first air intake system of FIG. 1.
Figure 3:
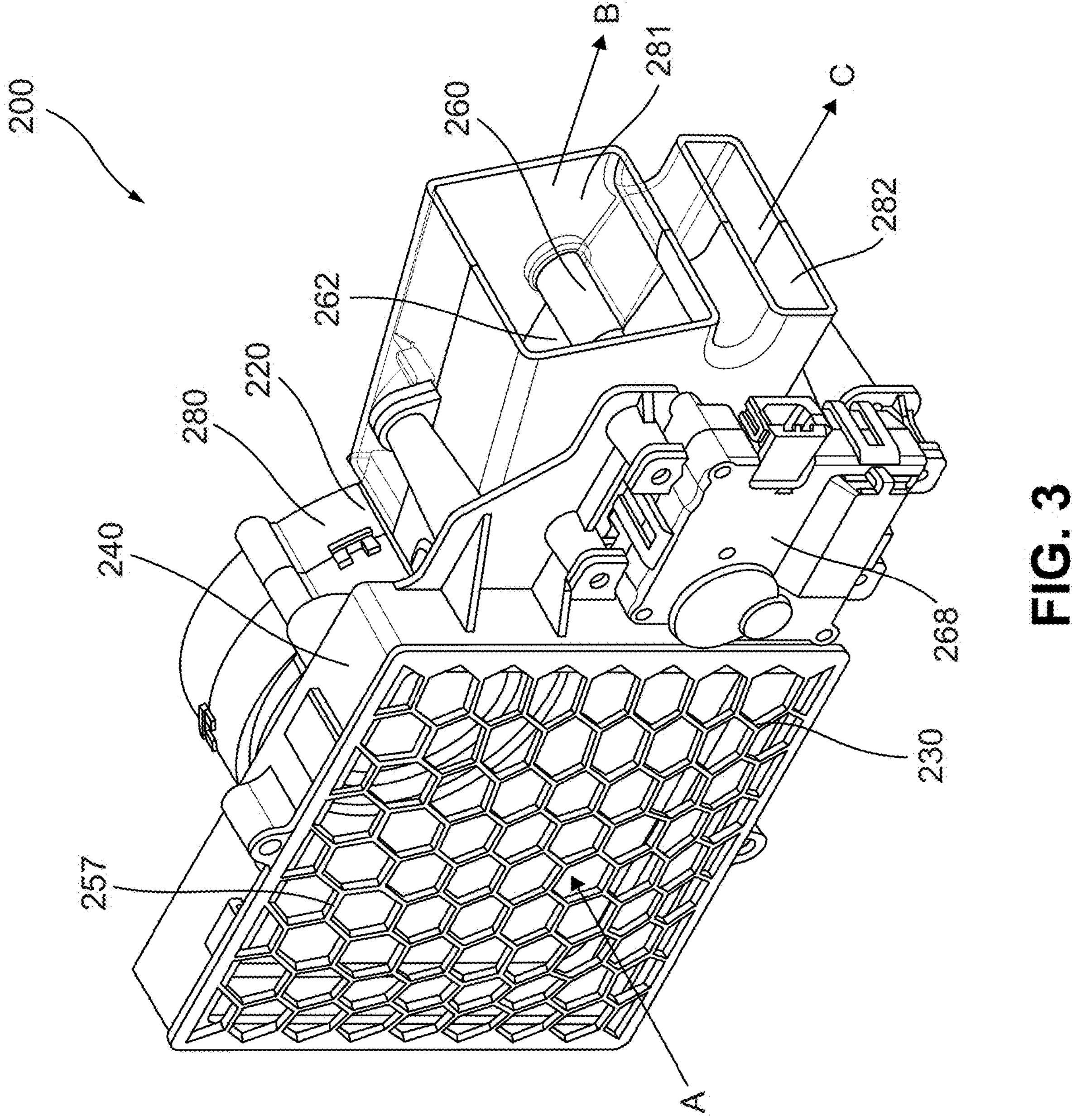
FIG. 3 is a perspective view of a second air intake system that is usable with an HVAC system, to provide air to an intake of a fan housing with the HVAC system.

FIG. 2 is an exploded view of the components of the system 100, and depicts that the housing 120 includes two sub-housings 140, and 180, which can be fixed together to establish the housing 120.

The first sub-housing 140 encloses the dehumidification component 150 and includes first and second sides 140*a*, 140*b* that collectively form an inner cavity 140*c* that the dehumidification component 150 rests therein. The first side 140*a* includes an air inlet aperture 141 that allows air to flow from the air inlet 130 to flow into or past the dehumidification component 150. The second side 140*b* includes an outlet aperture 142 that allows air to leave the dehumidification component 150 and flow out of the first sub-housing 140.

In some embodiments, the inlet aperture 141 and the outlet aperture 142 may be circular, while in other embodiments only one of the inlet or outlet apertures 141, 142 are circular, while in other embodiments, the apertures may be a different shape, such as square. In some embodiments, the inlet aperture 141 is the same shape as the shape of the dehumidification component 150, and particularly the shape and size of the working portion 150*z* of the dehumidification component 150. In this embodiment, the air flowing through the inlet aperture 141 allows air to flow across the entire surface area of the dehumidification component 150 to maximize the efficiency of the dehumidification component 150. In some embodiments, one or both of the first or second sides 140*a*, 140*b* may transition between cross-sectional shapes for air flow along their length, such as transition from a circular air flow cross-section at its entrance to a square flow cross-section at a position of the side that is proximate to the dehumidification component 150 (i.e. in embodiments, where the dehumidification component 150 has a square working portion in the path of inlet air that reaches the dehumidification component 150).

An air inlet 130 may a part of or may be fixed to the first sub-housing 140, and provides a path for air to flow into the first sub-housing. In some embodiments a door 132 may be provided upon the air inlet that is controlled by the HVAC controller 1000. The door 132 may be in an open position to allow air to flow into the housing 120, and a closed position to prevent air to flow into the housing 120.

The second sub-housing 180 may be provided and fixed to the first sub-housing 140, and arranged such that air that flows out of the outlet aperture 142 of the first sub-housing 140 flows into the second sub-housing 180. The second sub-housing may enclose and support the valve 160, and the heat sink 170 (when provided). The second sub-housing 180 forms the first air outlet 181 and the second air outlet 182. The second sub-housing 180 additionally supports and operator 168 that causes the valve to be positioned as desired. The operator 168 is in communication with an HVAC controller 1000, which controls the overall operation of the HVAC system, based upon vehicle operator/passenger selections as well as based upon sensed parameters (e.g. outside air temperature, outside air humidity, vehicle passenger compartment temperature, vehicle passenger compartment humidity).

The dehumidification component 150 is provided to receive a flow of air therethrough, or therepast in some embodiments, and when in operation assist with removing water vapor from the air that flows into the dehumidification component 150. The dehumidification component 150 may be a Ceramic Humidity Regulator (CHR). The dehumidification component 150 may be a desiccant. The dehumidification component 150 may be a PTC heater. The dehumidification component 150 may include two or more of these components either placed in series (from the perspective of air flowing through or past the dehumidification component 150. Alternatively, a portion of the dehumidification component 150 (such as the upper half) may be a first type of component, and the remaining portion (such as the lower half) may be a different type of component. This arrangement (i.e. the dehumidification component being different components in different portions thereof) when operated in concert with the valve 160 (discussed in detail below) may result in operational flexibility for the system, air can flow through certain specific portions of the dehumidification component 150 when a high amount of water vapor removal of air is desired (based upon the position of the valve 160 that allows air flow through specific portions of the dehumidification component 150), and air can flow through other specific portions of the dehumidification component 150 when a lower amount of water vapor removal (or no water vapor removal) is desired based upon a different positioning of the valve 160.

In another arrangement, a first portion dehumidification component 150 may have one (or more) of the moisture removal mechanisms discussed above, while a second portion of the dehumidification component 150 may be formed without any moisture removal mechanisms, to allow, based upon the position of the valve 160 the air to pass through the housing 120 when desired without any substantial water vapor removal.

The dehumidification component 150 includes at least two, and potential four or more, electrodes 152 that extend therefrom that are configured to allow the dehumidification component to be placed within an electrical circuit to allow electrical current to flow to the dehumidification component 150 during operation. The electrodes receive current as controlled by the HVAC controller 1000. In some embodiments, the dehumidification component 150 may include two or more zones 150*a*, 150*b* that can be operated differently, such the first zone 150*a* on and the second zone 150*b* off or vice versa, or with the first zone 150*a* operated at a first level, and the second zone 150*b* operated at a second (lower or higher) level). The operation of the zones 150*a*, 150*b* is based upon the amount of electrical current that passes through each zone, or the lack of electrical current passing through the respective zone. In some embodiments, the HVAC controller 1000 is configured to operate the different zones 150*a*, 150*b* (by controlling the amount of electrical current that flows to each zone—via the corresponding electrodes 152 for each zone) in order to control the amount of moisture (water vapor) that is removed from the air that passes through or across the specific zone 150*a*, 150*b*.

In some embodiments, the HVAC controller 1000 may be operate different zones 150*a*, 150*b* (by sending current to the specific zones desired to be operated) and not operate other zones (by not sending current to those zones). The HVAC controller 1000 may operate specific zones for a set time (with maintain the other zones deenergized) for a specific time, and then change or reverse the zones that are energized and deenergized. For example, the HVAC controller 1000 may operate the different zones in this manner to turn off zones when their temperature increases above a threshold to allow those zones to cool to a lower temperature that is appropriate for operation (or does not cause a substantial temperature increase of the air that passes through or past the zones). The HVAC controller 1000 may energize and deenergize specific zones based upon a time schedule (e.g. certain zones on and certain zones off for 10 minutes, and then reverse for the next 10 minutes, and so on) or may communicate with temperature sensors that are positioned proximate to the various zones and operate the zones with feedback control based upon the measured temperatures of each zone. The dehumidification component 150 may be configured such that when a specific zone is not energized it provides insignificant dehumidification. The term insignificant dehumidification is defined here to be less 25% or less of the dehumidification provided when the zone is energized and working properly.

In other embodiments, the dehumidification component 150 may be a PTC heater (positive temperature coefficient heater). In other embodiments the dehumidification component 150 may be or include a desiccant. In still other embodiments, the dehumidification component may include a semipermeable membrane, that tends to block flow of moisture (water vapor) therethrough, but allow air flow therethrough.

In some embodiments, the dehumidification component may be aligned for air to pass through the component, as is depicted in FIG. 2, with inlet air schematically depicted as X, and outlet air schematically depicted as Y. In other embodiments, the dehumidification component 150 may be aligned for air to pass across the component, but not through the component 150.

The valve 160 is best shown in FIG. 2 and may be rotatable with an operator 168, as controlled by the HVAC controller. In some embodiments, the valve 160 includes a blocking portion 162 and a pass-through portion 163 that allows air to flow therepast. In some embodiments, when it is desired to remove moisture from air that is received within the air intake system 100, the valve 160 is operated to align the pass-through portion 163 with the zone of the dehumidification component 150 that is then operating (by receipt of electric current) and the blocking portion 162 of the valve is aligned with a zone of the dehumidification component 150 that is not then operating. In this alignment, the air that flows through the valve 160 and toward the outlets 181, 182 in the second housing 180 has had moisture removed therefrom, such that air flowing through the first outlet 181 (which is directed to the fan housing 300 inlet) has less moisture content than the air that entered the housing 120. In other embodiments, the valve 160 is not provided such that air can flow directly from the dehumidification component 150 within the housing 120 and to the heat sink (when provided) and to the air outlet 180.

In this embodiment, if it is not desired to remove moisture from the air that flows into the housing 120, the valve 160 is aligned such that the pass-through portion 163 is aligned with a zone within the dehumidification component 150 that is not then operating. In another embodiment, it is possible to align the pass through portion 163 of the valve 160 across a portion of the then operating zone (e.g. 150*a*) and a portion of the then not operating zone (150*b*), which includes an air flow with a partially reduced moisture content (but not reduced to the extent if only air that passed through the pass-through portion had passed through a then operating zone.

In some embodiments, the valve 160 is positioned to direct air flowing from the dehumidification component 150 into one of the first and second outlets 181, 182. For example, the valve 160 may be positioned to align the pass-through portion 163 with a zone of the dehumidification component 150*a* that is operating, such that air that passes out of that zone is directed to the first air outlet 181, which connected to an fan housing 300 inlet. The valve as aligned to prevent air from flowing through the second outlet 182. The term "prevent" is used herein to mean completely preventing flow as well as potentially allowing a di minimus amount of flow, such as due to improper sealing due to slight mis-alignments, due to tolerance stacking, or due to wear of components after use. In some embodiments, housing 120 is configured to cause any liquid that gathers therein, such as condensate that forms due to the operation of the dehumidification component 150, flows toward the second air outlet 182 and can flow out of the housing 120 via the second air outlet 182, either continuously (as condensate forms that reaches the second air outlet 182) or periodically due to the position of the valve 160 that allows liquid to flow within the housing 120 to reach the second air outlet 182.

In some embodiments, the valve 160 may be configured to be operated to direct air that flows through or past the one or more zones 150*b* of the dehumidification component 150 that are not being operated to the second air outlet 182, which directs the air that flows therethrough outside of the vehicle and not into the passenger compartment.

A heat sink 170 may be provided within the housing 120, and is preferably provided downstream of the dehumidification component 150. In one embodiment, air that has passed through or across the one or more operating zones 150*a* of the dehumidification component 150 moves past a first portion 171 of the heat sink 170 before it reaches the first air outlet 181. Air that has moved across non-operating zones 150*b* of the dehumidification component 150 moves past a second portion 172 of the heat sink 170, either before being directed to the second air outlet 182, or before being reunited with air that flows through the first air outlet 181. The air that has moved through or past the operating zones 150*a* of the dehumidification component gains heat from the operating zone, while air that flows through or past a non-operating zone does not gain any substantial heat. The air that has gained heat transfers some of that heat to the first portion 171 of the heat sink. The heat transfers within the heat sink toward the second portion 172 that is at a lower temperature, and that heat is transferred to the air that flows past the second portion. The placement of the heat sink 170 causes some heat that is in the air flow path that passes across the second portion 172 (and would low out the second air outlet 182) to be transferred to the heat sink 170 and flow to the first portion 171. The air that flows out of the first air outlet 181 receives this transferred heat from the first portion 171 to cause the air to increase in temperature.

A second embodiment of an air inlet system 200 is provided in FIGS. 3-6. The air intake system 200 may have the same components of the system 100, discussed above, with changes discussed herein. Regarding system 200, related components to the system 100 (discussed above) have the same element numbers in the tens and ones digits (e.g. 230 is the same or similar to 130) with specific differences discussed herein.

The system 200 includes a housing 220, that includes an air inlet 230 that includes a grate 237, to allow constant air flow into the first housing portion 240 (air flow A, FIG. 3 schematic), instead of the door 132 as discussed above. The housing 220 may include first and second air outlets 281, 282 that are disposed to have flow out of the first and second outlets (B, C, respectively, schematic) a perpendicular angle (or about perpendicular) to the direction of air flowing into the housing (flow A). Alternatively, the first and/or second air outlets 281, 282 may project air (flows B and C) in substantially the same direction that air entered into the housing 220 (like the system 100, depicted in FIGS. 1-2). The housing 220 includes a dehumidification component 250 (similar to 150, now shown in FIG. 3), and a valve 260. The second housing 280 may include a heat sink 270, similar to heat sink 170.

In some embodiments, the housing 220 may be provided with a valve 260 may be disposed proximate to the first and second air outlets 281, 282 and may be positioned to control the ability of air to flow out of the first and second outlets 281, i.e. a position to allow air to flow out of the first outlet 281 and prevent air to flow out of the second outlet 282, a second position to do the opposite (air allowed to flow out of the second outlet 282, but prevented from flowing out of the first outlet 281), and a position to allow some flow out of both outlets 281, 282.

In some embodiments, and usable with one or both of the first and second housings 120, 220 discussed above, the housing may include a fan (e.g. 290, FIG. 4) that receives air from the dehumidification component and urges air to flow to the first air outlet (which flows to the fan housing 300 inlet of the HVAC system). The fan assists with air flow through the housing 120, 220 to maximize flow through the dehumidification component, which slows down based upon air flow restrictions within the dehumidification component. The suction of the fan creates a vacuum upstream of the fan, which urges air to pass through or past the dehumidification component, and the fan discharges air at a high pressure, which urges air through the first air outlet (flow B, schematic). The fan may constantly operate, or may operate selectively as controlled by the HVAC controller 1000.

Figure 4:
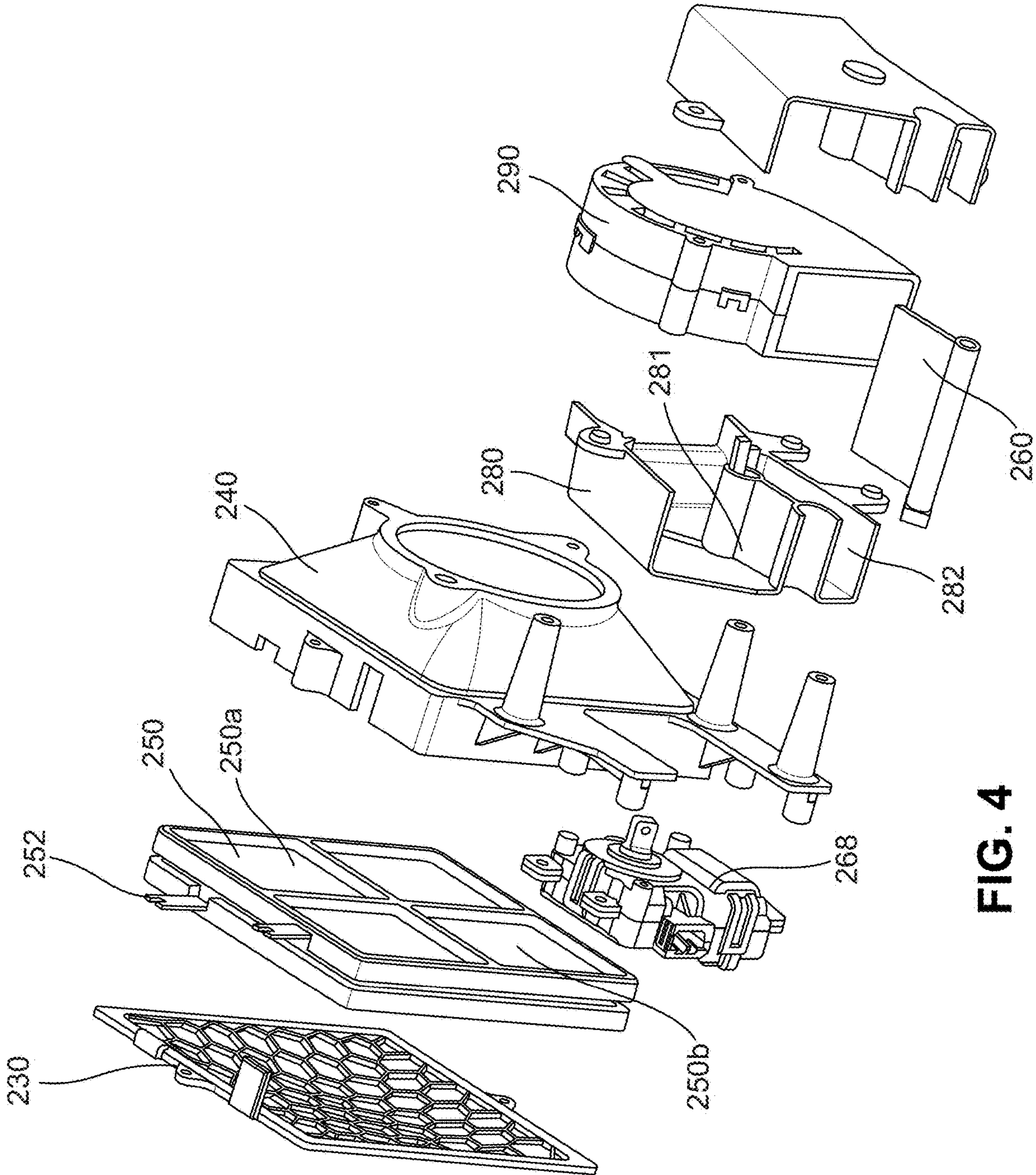
FIG. 4 is an exploded view of a first possible construction of the second air intake system of FIG. 3.
Figure 5:
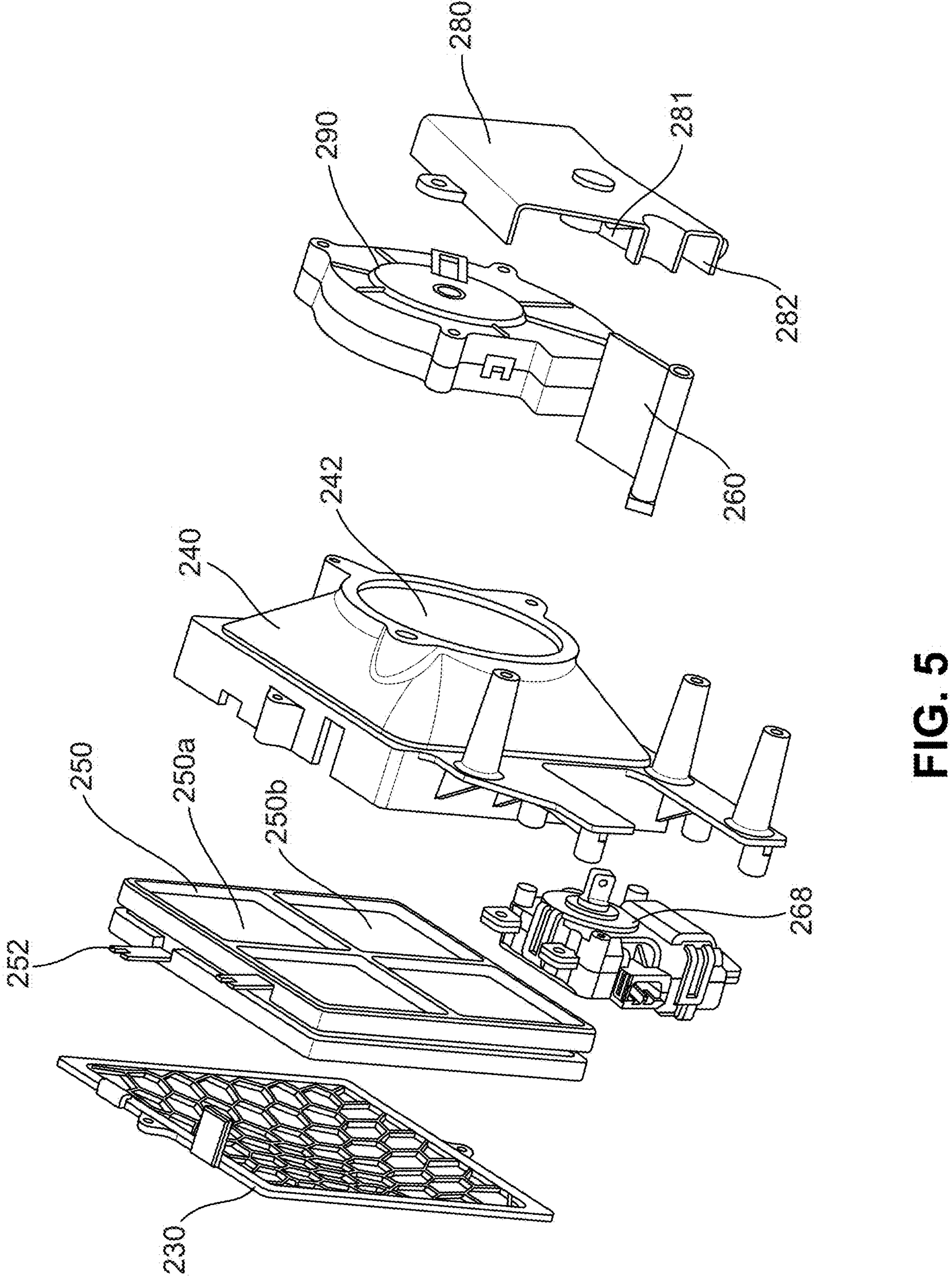
FIG. 5 is an exploded view of a second possible construction of the second air intake system of FIG. 3.
Figure 6:
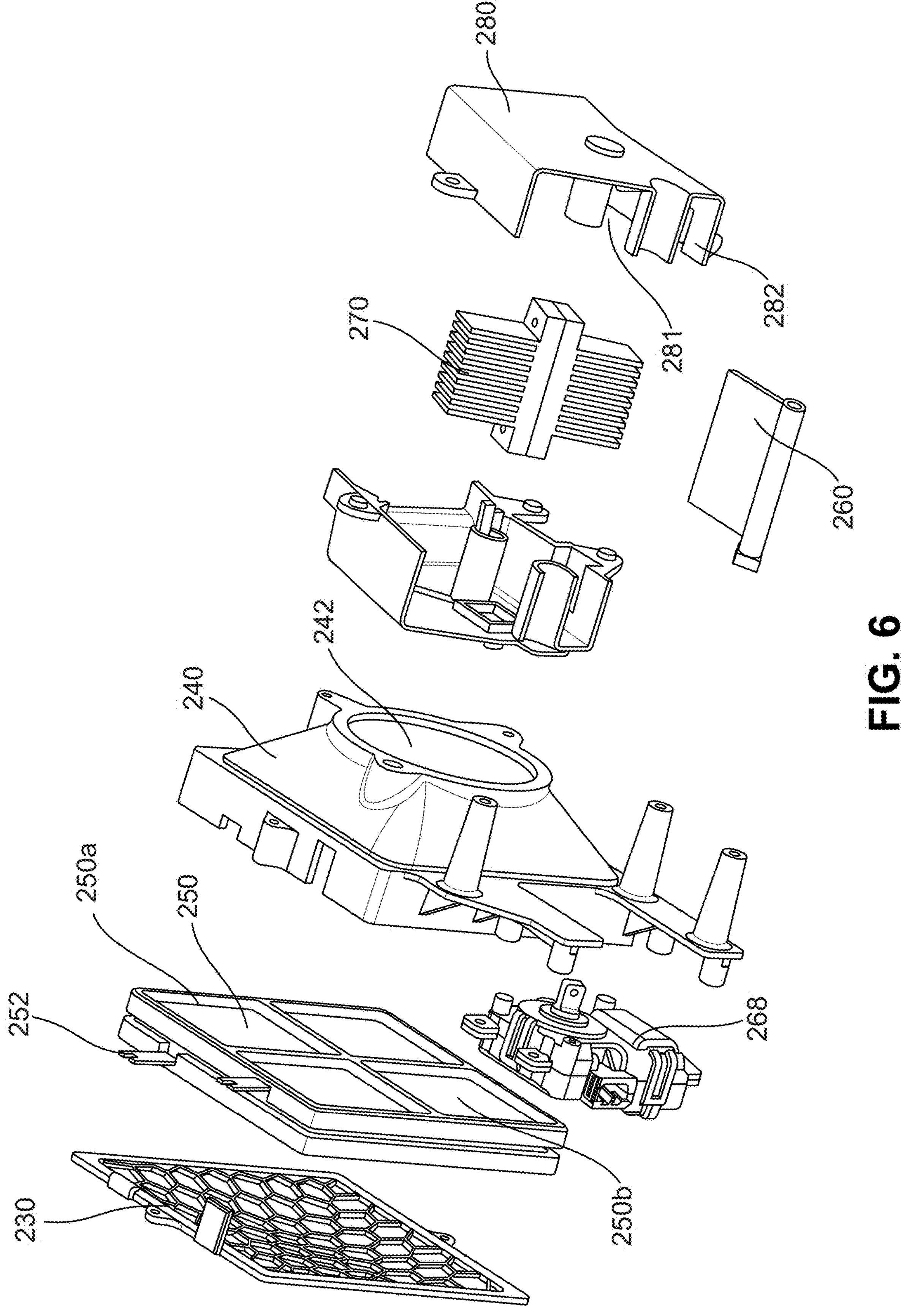
FIG. 6 is an exploded view of a third possible construction of the second air intake system of FIG. 3.
Figure 7:
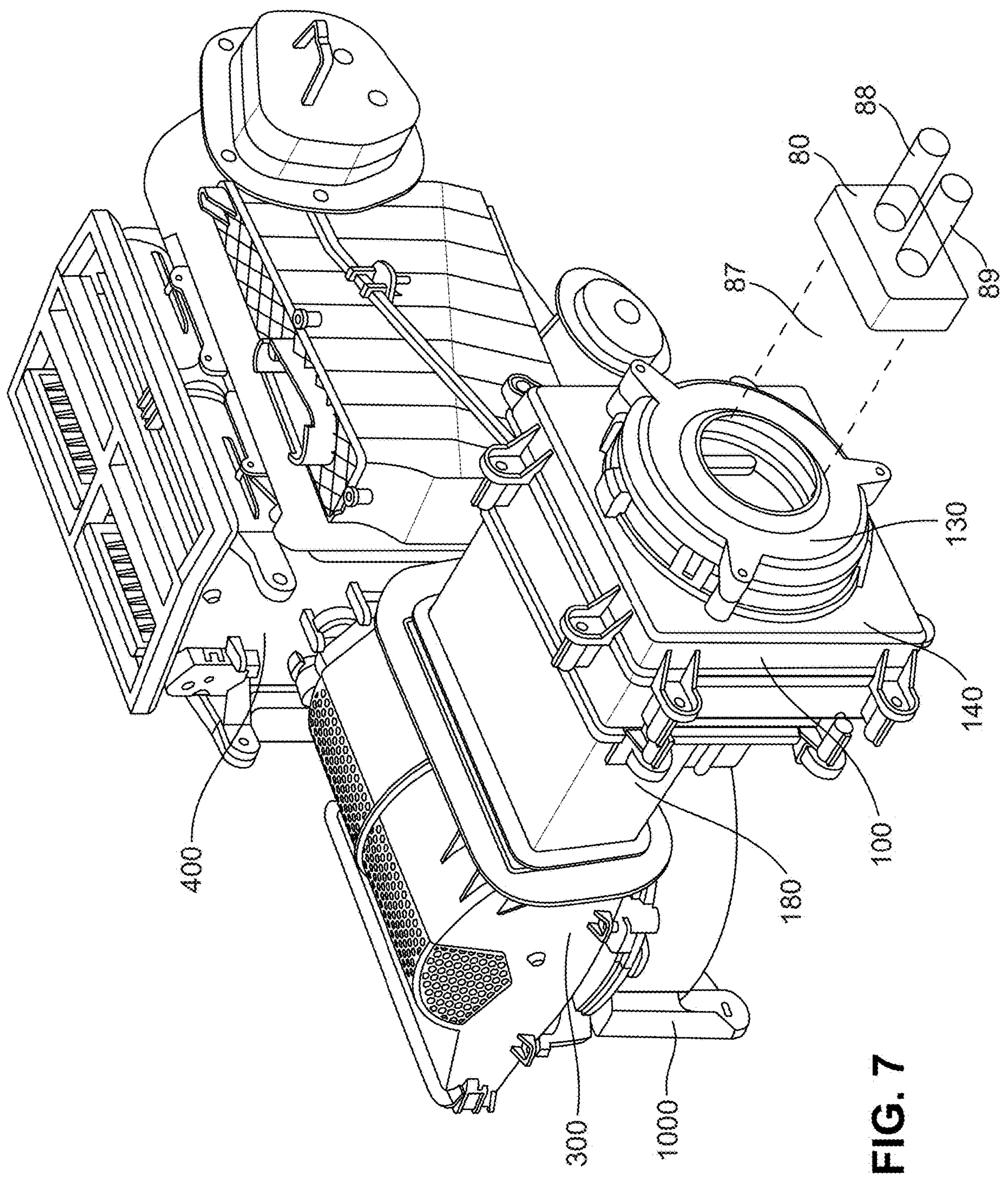
FIG. 7 is a perspective view of the first air intake system connected to an intake housing of an HVAC system, showing schematically a possible (optional) air inlet flowpath into the air intake system.

FIGS. 4, 5, and 6 depict different possibilities of the second system 200. FIG. 4 depicts the second system without a fan and without a heat sink disposed within the second sub-housing 280. FIG. 5 depicts the second system 200 with a fan 290 disposed within the second sub-housing 280. FIG. 6 depicts the second system 200 with a heat sink 270 disposed within the second sub-housing 280.

The term "about" is specifically defined herein to include a range that includes the reference value and plus or minus 5% of the reference value. The term "substantially the same" is when the item under comparison is within 5% of the aspect of the reference value of the item.

The computing elements or functions disclosed herein, such that forms the HVAC controller 1000 or other controllers described herein, may include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory. Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Naturally, in view of the teachings and disclosures herein, persons having ordinary skill in the art may appreciate that alternate designs and/or embodiments of the invention may be possible (e.g., with substitution of one or more components for others, with alternate configurations of components, etc.). Although some of the components, relations, configurations, and/or steps according to the invention are not specifically referenced and/or depicted in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned and/or depicted structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification can be readily understood with reference to the following Representative Paragraphs:

Representative Paragraph 1: An air intake system for a vehicle HVAC system, comprising:

- a housing comprising an air inlet, a dehumidification component, a first outlet and a second outlet disposed to receive air that has flowed past the dehumidification component, wherein the first outlet is aligned to direct air flowing therethrough toward a downstream fan that provides air flow within a vehicle HVAC system and ultimately to a passenger compartment for the vehicle, and the second outlet is aligned to direct air flowing therethrough out of the vehicle and not into the passenger compartment;
- the dehumidification component configured to receive electric current during operation.

Representative Paragraph 2: The air intake system for a vehicle HVAC system of Representative Paragraph 1, wherein the dehumidification component is a PTC heater.

Representative Paragraph 3: The air intake system for a vehicle HVAC system of Representative Paragraph 1, wherein the dehumidification component is a desiccant.

Representative Paragraph 4: The air intake system for a vehicle HVAC system of Representative Paragraph 1, wherein the dehumidification component is a ceramic humidity regulator.

Representative Paragraph 5: The air intake system for a vehicle HVAC system of any one of Representative Paragraphs 1-4, wherein the housing is configured to be disposed such that air flowing into the air inlet flows from the passenger compartment of the vehicle.

Representative Paragraph 6: The air intake system for a vehicle HVAC system of any one of Representative Paragraphs 1-5, further comprising a valve disposed downstream of the dehumidification component, wherein the valve is operable to control air flow from the dehumidification component and to the first and second outlets.

Representative Paragraph 7: The air intake system for a vehicle HVAC system of any one of Representative Paragraphs 1-6, wherein the dehumidification component includes a plurality of separate zones, with each zone being capable of providing dehumidification of air that flows therethrough when energized and providing insignificant dehumidification when not energized, and wherein each of the plurality of zones can be separately controlled by an HVAC controller by selectively allowing electrical current flow to one or more zones desired for dehumidification of air flowing therepast and selectively preventing electrical current flow to one or more zones not desired for dehumidification of air flowing therepast.

Representative Paragraph 8: The air intake system for a vehicle HVAC system of Representative Paragraph 7, further comprising a valve disposed downstream of the dehumidification component, wherein the valve is operable to control air flow from the dehumidification component and to the first and second outlets, wherein the HVAVC controller is configured to operate the dehumidification component and the valve together such that air flows through one or more zones of the plurality of separate zones of the dehumidification component that is being operated by the HVAC controller and then past the valve toward the first outlet.

Representative Paragraph 9: The air intake system for a vehicle HVAC system of Representative Paragraph 8, wherein the valve is positioned to block air from flowing past the one or more zones of the dehumidification component that are not desired for dehumidification.

Representative Paragraph 10: The air intake system for a vehicle HVAC system of Representative Paragraph 8, wherein the valve is operable to direct air that flows through the one or more zones that are being operated by the HVAC controller to the first outlet, and to direct air that flows through the one or more zones of the plurality of zones that are not being operated to the second outlet.

Representative Paragraph 11: The air intake system for a vehicle HVAC system of Representative Paragraph 10, wherein the housing directs condensed water vapor from the dehumidification component to flow out of the second outlet.

Representative Paragraph 12: The air intake system for a vehicle HVAC system of any one of Representative Paragraphs 7-11, wherein the air inlet comprises an inlet aperture, and wherein further comprising a door that can selectively allow air flow through the inlet aperture and block air flow through the inlet aperture, wherein the door is controlled by the HVAC controller.

Representative Paragraph 13: The air intake system for a vehicle HVAC system of Representative Paragraph 1, further comprising a heat sink disposed downstream of the dehumidification component, such that air that passes the dehumidification component passes the heat sink before flowing to the first or second air outlet.

Representative Paragraph 14: The air intake system for a vehicle HVAC system of Representative Paragraph 13, wherein the heat sink receives heat from air that flows therepast on a path toward the second outlet, wherein the received heat flows to a portion of the heat sink that air directed to the first outlet flows therepast to transfer heat from the air flowing to the second outlet to the air flowing toward the first outlet.

The invention claimed is:

1. An air intake system for a vehicle HVAC system, comprising:

- a housing comprising an air inlet, a dehumidification component, a valve disposed downstream of the dehumidification component, a first outlet and a second outlet disposed to receive air that has flowed past the dehumidification component, wherein the first outlet is aligned to direct air flowing therethrough toward a downstream fan that provides air flow within a vehicle HVAC system and ultimately to a passenger compartment for the vehicle, and the second outlet is aligned to direct air flowing therethrough out of the vehicle and not into the passenger compartment;

wherein the dehumidification component configured to receive electric current during operation;

wherein the dehumidification component includes a plurality of separate zones, with each zone being capable of providing dehumidification of air that flows therethrough when energized and providing insignificant dehumidification when not energized; and wherein the valve is positioned to block air from flowing past the one or more zones of the dehumidification component that are not desired for dehumidification.

2. The air intake system for a vehicle HVAC system of claim 1, wherein the dehumidification component is a PTC heater.

3. The air intake system for a vehicle HVAC system of claim 1, wherein the dehumidification component is a desiccant.

4. The air intake system for a vehicle HVAC system of claim 1, wherein the dehumidification component is a ceramic humidity regulator.

5. The air intake system for a vehicle HVAC system of claim 1, wherein the housing is configured to be disposed such that air flowing into the air inlet flows from the passenger compartment of the vehicle.

6. The air intake system for a vehicle HVAC system of claim 1, wherein the valve is operable to control air flow from the dehumidification component and to the first and second outlets.

7. The air intake system for a vehicle HVAC system of claim 1, wherein each of the plurality of zones can be separately controlled by an HVAC controller by selectively allowing electrical current flow to one or more zones desired for dehumidification of air flowing therepast and selectively preventing electrical current flow to one or more zones not desired for dehumidification of air flowing therepast.

8. The air intake system for a vehicle HVAC system of claim 7, wherein the valve is operable to control air flow from the dehumidification component and to the first and second outlets, wherein the HVAVC controller is configured to operate the dehumidification component and the valve together such that air flows through one or more zones of the plurality of separate zones of the dehumidification component that is being operated by the HVAC controller and then past the valve toward the first outlet.

9. The air intake system for a vehicle HVAC system of claim 8, wherein the valve is operable to direct air that flows through the one or more zones that are being operated by the HVAC controller to the first outlet, and to direct air that flows through the one or more zones of the plurality of zones that are not being operated to the second outlet.

10. The air intake system for a vehicle HVAC system of claim 9, wherein the housing directs condensed water vapor from the dehumidification component to flow out of the second outlet.

11. The air intake system for a vehicle HVAC system of claim 7, wherein the air inlet comprises an inlet aperture, and wherein further comprising a door that can selectively allow air flow through the inlet aperture and block air flow through the inlet aperture, wherein the door is controlled by the HVAC controller.

12. The air intake system for a vehicle HVAC system of claim 1, further comprising a heat sink disposed downstream of the dehumidification component, such that air that passes the dehumidification component passes the heat sink before flowing to the first or second air outlet.

13. The air intake system for a vehicle HVAC system of claim 12, wherein the heat sink receives heat from air that flows therepast on a path toward the second outlet, wherein the received heat flows to a portion of the heat sink that air directed to the first outlet flows therepast to transfer heat from the air flowing to the second outlet to the air flowing toward the first outlet.

14. The air intake system for a vehicle HVAC system of claim 1, wherein the valve is configured to rotate about a center axis of the valve.

15. The air intake system for a vehicle HVAC system of claim 1, wherein the valve comprises a blocking portion and a pass-through portion that allows air to flow therepast.

* * * * *